United States Patent [19]

Matsui et al.

[11] 4,313,654
[45] Feb. 2, 1982

[54] AUTOMATIC RANGEFINDER SYSTEM FOR PHOTOGRAPHIC CAMERA WITH LIGHT EMITTING AND RECEIVING MEANS

[75] Inventors: Toru Matsui, Osaka; Motonobu Matsuda, Kawachinagano; Hiroshi Ueda, Nara; Yasuhiro Nanba, Osaka; Yoshio Kuramoto, Toyonaka, all of Japan

[73] Assignee: Minolta Camera Kabushiki Kaisha, Higashi, Japan

[21] Appl. No.: 940,135

[22] Filed: Sep. 6, 1978

[30] Foreign Application Priority Data

Sep. 6, 1977 [JP] Japan ................................. 52-107533
Sep. 6, 1977 [JP] Japan ................................. 52-107534

[51] Int. Cl.³ .............................................. G03B 3/00
[52] U.S. Cl. ....................................... 354/25; 354/31; 356/1
[58] Field of Search ................... 354/25, 31, 162, 163, 354/165, 195, 197, 288, 295; 352/139, 140; 250/201; 356/1, 4

[56] References Cited

U.S. PATENT DOCUMENTS

Re. 27,461  8/1972  Harvey ........................... 354/25
3,617,128  11/1971  Harvey ........................ 354/163 X
3,723,003   3/1973  Vockenhuber ................ 354/163 X
3,836,919   9/1974  Matsumoto et al. .......... 354/163 X
3,936,187   2/1976  Momose ........................ 354/25
4,032,934   6/1977  Hendrickson ................. 354/165 X
4,085,320   4/1978  Wilwerding .................... 354/25
4,104,650   8/1978  Hosoe et al. ................... 354/25

FOREIGN PATENT DOCUMENTS 49-49625  5/1974  Japan .

Primary Examiner—L. T. Hix
Assistant Examiner—William B. Perkey
Attorney, Agent, or Firm—Wenderoth, Lind & Ponack

[57] ABSTRACT

A photographic camera having an automatic rangefinder system wherein a light emitter projects a beam of light through a convergent lens to illuminate a target object. This beam of light is detected through another convergent lens by one of a group of photoresponsive elements forming a light receiver. Depending upon which photoresponsive element of the light receiver detects the reflected beam of light, the range of the target object to be photographed from the photographic camera is indicated. The light emitter and the light receiver are supported by a single support member in laterally offset relation to each other and the lens elements for converging the projected beam of light and the reflected beam of light, respectively, are integrally formed of a synthetic resin. The rangefinder elements are assembled into a rangefinder module.

14 Claims, 13 Drawing Figures

AUTOMATIC RANGEFINDER SYSTEM FOR PHOTOGRAPHIC CAMERA WITH LIGHT EMITTING AND RECEIVING MEANS

BACKGROUND OF THE INVENTION

The present invention relates to an automatic rangefinder of the zone monitoring type for finding the distance of a target object from a reference plane and, more particularly, to a rangefinder of the type described above for use in a photographic camera for measuring the distance between a zone in which a target object to be photographed lies and the camera.

There is known one zone monitoring type automatic rangefinder for a photographic camera which comprises a light emitter for developing and projecting through a convergent lens a beam of light, pulsated at a predetermined frequency, to illuminate a target object located within one of a plurality of zones at different distances away from the photographic camera, a light receiver including photoresponsive elements substantially equal in number to the number of the zones for detecting the pulsated beam of light illuminating the target object through another convergent lens, said photoresponsive elements being so arranged as to monitor the respective distances of the zones, each of said photoresponsive elements having a parameter the magnitude of which varies as a function of the intensity of the pulsated beam of light received thereby, and means coupled to the light receiver and responsive to change in the magnitude of the parameter of any one of the photoresponsive elements to indicate which range of distances the target object occupies, that is, in which one of the plurality of zones the target object lies.

Examples of the zone monitoring type automatic rangefinder are disclosed, for example, in the U.S. Pat. No. 27,461, reissued on Aug. 15, 1972, and the U.S. Pat. No. 3,723,003, patented on Mar. 27, 1973.

The concept of another zone monitoring type rangefinder is generally based on the principle of triangulation in which a beam of light is projected by a light emitter through a projecting convergent lens and subsequently reflected from a target object and is focused by a receiving convergent lens on one of a plurality of photoresponsive elements of a light receiver located in a predetermined position offset laterally relative to the light emitter so as to determine the altitude of the triangle formed by the light emitter, the target object and the light receiver as a function of the angle of incidence of the reflected light on the receiving convergent lens, this altitude being representative of the distance between the light emitter and the target object.

In this known rangefinder of the type described above, the light emitter and the light receiver are employed separately and positioned, for example, one on each side of the objective lens assembly of the photographic camera and, therefore, a relatively large base length, i.e., the distance between the light emitter and the light receiver, is required so that the rangefinder will have a relatively high resolution, i.e. will measure the distance rather closely. In general, the larger the base length, the higher the resolution of the rangefinder.

However, considering the limited space available in a photographic camera for accommodating the rangefinder, the increased base length does not accord with the recent trend in the photographic industry to manufacture photographic cameras as compact and as lightweight as possible and, therefore, is not feasible. This will now be discussed in connection with another prior art rangefinder disclosed in Japanese Laid-open Patent Publication No. 49-49625, laid open to public inspection on May 14, 1974, and reproduced in FIG. 1 of the accompanying drawings.

Figure 1:
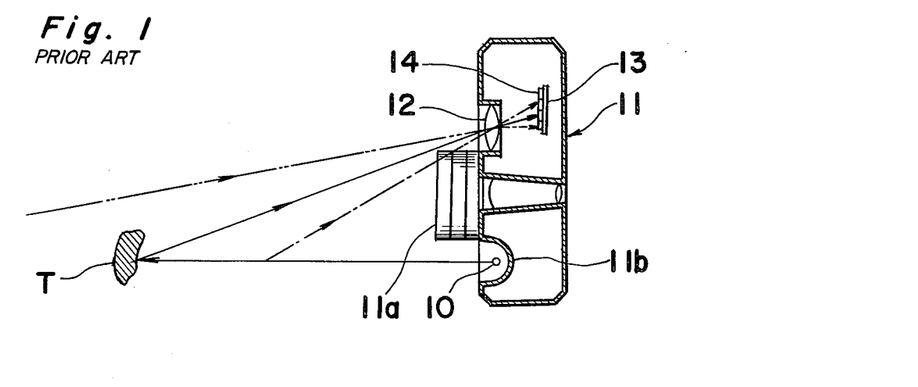
FIG. 1 is a schematic top plan view of a photographic camera, with a portion broken away to show a prior art rangefinder built in the camera, reference to which has already been made.

Referring now to FIG. 1, the rangefinder disclosed in the above mentioned publication comprises a light emitter 10 capable of producing a flash of light in synchronism with the shutter release in a photographic camera 11 to illuminate a target object T, an image forming lens 12 positioned on one side of the objective lens assembly 11a of the photographic camera 11 remote from the light emitter 10, and a light receiver 13 positioned behind the image forming lens 12 in terms of the direction towards the target object T. The light receiver 13 is constituted by a plurality of photoresponsive elements 14, such as photodiodes or photoconductors, supported in side-by-side relation to each other on a support base 13a and assigned to monitor respective distances of zones away from the camera 11. The image forming lens 12 serves to form an image of the area of the target object T, which has been illuminated by the flash of light from the light emitter 10, of any one of the photoresponsive elements depending on the distances of the zone in which the target object T lies.

In the known rangefinder having the construction shown in FIG. 1, the base length, that is, the distance between the light emitter 10 and the light receiver 13 is relatively large and substantially larger than the maximum outer diameter of the objective lens assembly 11a employed in the camera 11. The reason for the employment of the increased base length for the distance measurement will be described below. In any event, the above mentioned publication also discloses the use of an electro-mechanical arrangement for effecting a focus adjustment of the objective lens assembly 11a in response to the measurement of the altitude of the triangle formed by the light emitter 10, the target object T and the light receiver 12. In particular, the mechanism necessary for driving a focusing lens group mounted within the objective lens assembly 11a is constituted by a return biasing spring, applying a biasing force to the focusing lens group integrally coupled with or linked with a ratchet so that the focusing lens group can linearly move from an infinity or hyperfocal position towards a "near" position, and an electromagnet adapted to selectively engage a pivotally supported pawl member with and disengage it from the ratchet. This pawl and ratchet mechanism is also disclosed in the above mentioned U.S. Reissue Patent, except for the difference in that the ratchet employed in the latter is in the form of a toothed disc so that the focusing lens group can be axially moved while revolving about the optical axis of the focusing lens group.

In general, the resolution of the rangefinder will primarily depend on the base length between the light emitter and the light receiver and the extent to which a confined bundle of rays of light projected from the light emitter 10 spreads as it travels a substantial distance away from the position of the light emitter, which factors are correlated with each other. For example, if the base length is relatively large, a relatively high resolution of the rangefinder can be achieved for a given spread of the bundle of rays of light projected from the light emitter since there is substantially no possibility that the light sensed by the light receiver 13 through the image forming lens 12 impinges upon, that is, is detected simultaneously by, two or more adjacent photoresponsive elements. Stated differently, a substantially equal resolution can be achieved in a rangefinder system wherein a relatively large base length is employed with a relatively great spread of the bundle of rays of light projected from the light emitter and in a rangefinder system wherein a relatively small base length is employed with a relatively small spread of the bundle of rays of light projected from the light emitter.

However, considering the limited space available in the recently developed photographic cameras for accommodating a rangefinder, the employment of a relatively small base length, for example, 20 mm., is desirable. Therefore, in order to achieve a relatively high resolution of the rangefinder, the employment of the relatively small base length creates two problems to be solved. One is to minimize the cross sectional area of the bundle of rays of light from the light emitter, that is, to minimize the light emitting area of the light emitter, and the other is to minimize the size of each of the photoresponsive elements. On the other hand, minimization of the light emitting area of the light emitter and the size of each of the photoresponsive elements are likely to reduce the light energies to such an extent that the rangefinder will fail to operate correctly and satisfactorily. Yet, the employment of the relatively small base length will require a precise positioning of the light emitter and the light receiver relative to each other.

In addition, irrespective of the base length, the employment of the separate light emitter and light receiver such as in any one of the prior art rangefinders require a precise and, therefore, complicated procedure to install the light emitter and the light receiver in a photographic camera at predetermined positions relative to each other. Moreover, the installation of the light emitter and the light receiver is time-consuming and, if done quickly, requires at least two attendant workers resulting in an increased cost of manufacture.

SUMMARY OF THE INVENTION

Accordingly, the present invention has been developed with a view to substantially eliminating the disadvantages and inconveniences inherent in the prior art rangefinder and is intended to provide an improved rangefinder which is easy to assemble, is compact in size and which has a relatively high level of performance.

Another object of the present invention is to provide an improved rangefinder of the type referred to above, wherein the light emitter and the light receiver both formed on a support base are assembled into a single module together with image forming lenses which are integrally formed by the utilization of a known plastic molding technique.

A further object of the present invention is to provide an improved rangefinder of the type referred to above, wherein the module including the light emitter, the light receiver and the image forming lenses are compact in size and, therefore, can readily be installed in a photographic camera during the manufacture of the latter without causing an increase in manufacturing cost.

A still further object of the present invention is to provide an improved rangefinder of the type referred to above, wherein the light emitter has a light emitting area of substantially elongated configuration, the width of the light emitting area being small while the length of the light emitter as measured in a direction perpendicular to the width is large, and which, therefore, can emit a beam of light of relatively high energy which in turn results in the light receiver receiving incident light of high intensity.

A still further object of the present invention is to provide an improved rangefinder of the type referred to above, which substantially contributes to reduction in size of the photographic camera and does not constitute a substantial obstacle to the recent trend in the photographic industry to make photographic camera compact.

According to the present invention, the light emitter projects a beam of light, for example, either pulsated at a predetermined frequency or in the form of a flash of light, in a direction towards the target object along the line-of-sight path between the photographic camera and the target object through a first convergent lens. The light receiver having a plurality of photoresponsive elements and disposed on the support base together with the light emitter at a position offset laterally of the light emitter is selectively responsive to the beam of light reflected through a second convergent lens from a particular zone at a distances away from the camera because of the presence of the target object within such particular zone. One of the photoresponsive elements, upon receiving this incident beam of light through the second convergent lens, generates a signal necessary to stop the motion of the focus adjustment means at a position for positioning and holding the focusing lens group in its correct range adjustment.

The light emitter has an elongated light emitting area defined therein and from which a beam of light having sufficient energy is emitted so that the light receiver will detect the incident beam of light of correspondingly sufficient energy as it comes through the second convergent lens. This is an essential feature of the present invention, since it enables the light emitter and the light receiver to be formed on a single support base with a minimum possible base length therebetween and without substantially reducing the performance of the rangefinder.

In practising the present invention, as is well understood by those skilled in the art, care must be taken to avoid the possibility that the photoresponsive elements forming the light receiver undesirably respond not only to the beam of light illuminating the target object, but also to the ambient light. In this connection, various methods are well known in the art and any of these methods can be employed in the present invention. However, in a preferred form of the present invention, the photoresponsive elements forming the light receiver have a spectral resolution which is selected to match the light emitted by the emitter, and the light emitter is a type capable of emitting a beam of light in the infrared range.

BRIEF DESCRIPTION OF THE DRAWINGS

These and other objects and features of the present invention will become apparent from the following description of preferred embodiments thereof taken in conjunction with the accompanying drawings, in which.

DETAILED DESCRIPTION OF THE INVENTION

Before the description of the present invention proceeds, it is to be noted that like parts are designated by like reference numerals throughout the accompanying drawings.

The principle of the rangefinder employed in the practice of the present invention will first be described with particular reference to FIGS. 2 to 5. However, it is to be noted that, although in FIGS. 2 to 5, the light emitter and the light receiver are shown as supported separately or constituted by separate members, the separate employment or support of these elements does not constitute the subject matter of the present invention.

Referring to FIGS. 2 to 5, a rangefinder shown therein for the purpose of illustrating the principle of the present invention comprises first and second convergent lenses 15 and 16 arranged in side-by-side relation to each other with their respective optical axes extending in parallel relation to each other and spaced a predetermined base length L. A light emitter 17 is positioned behind the first convergent lens 15 in alignment with the optical axis of said lens 15 in terms of the direction in which the rangefinder is aimed at a target object which may be located in any one of a plurality of zones A, B, C and D at various distances from the rangefinder, and at a position adjacent the secondary focal point of the convergent lens 15.

Figure 2:
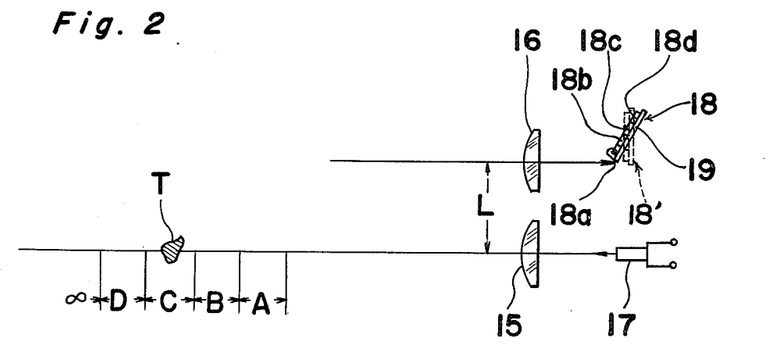
FIG. 2 is a schematic diagram showing an optical system of a rangefinder for the purpose of illustration of the principle of the present invention.

A light receiver 18 including a plurality of, for example, four, photoresponsive elements 18a, 18b, 18c and 18d arranged on a support base 19 in side-by-side relation to each other is positioned behind the second convergent lens 16 in terms of the direction in which the rangefinder is aimed at the target object. As best shown in FIG. 2, this light receiver 18 is so positioned and so tilted at a predetermined angle relative to the optical axis of the convergent lens 16 that the photoresponsive elements 18a to 18d respectively assume a conjugate relation to the zones A to D of distances with respect to the second convergent lens 16. More specifically, the photoresponsive elements 18a to 18d of the light receiver 18 are so arranged relative to the second convergent lens 16 that the image of the target object will be focused on the photoresponsive element 18a, if the target object is located within the zone A; on the photoresponsive element 18b, if the same is located within the zone B; on the photoresponsive element 18c, if the same is located within the zone C; and on the photoresponsive element 18d if the same is located within the zone D.

However, as shown by the broken line 18', the light receiver may be so positioned as to intersect the optical axis of the second convergent lens 16 at right angles with the photoresponsive elements distributed in a direction perpendicular to the optical axis of the second convergent lens 16.

Figure 7:
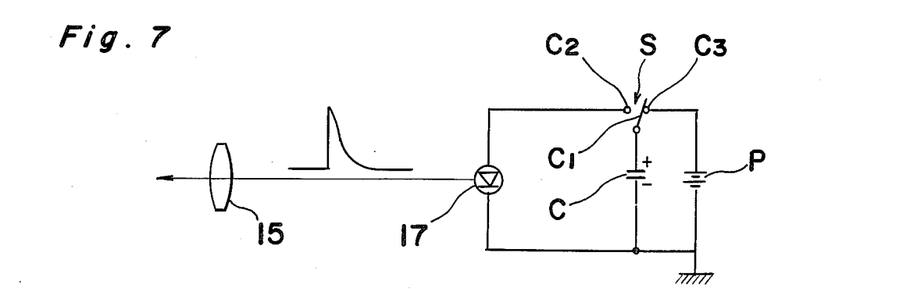
FIG. 7 is a schematic circuit diagram showing a power source circuit for the light emitter.

In the system shown in FIG. 2, the light emitter 17 is electrically connected to a power source circuit shown in FIG. 7, which power source circuit comprises a single throw switch S having a movable contact C1, grounded through a charging capacitor C, and a pair of fixed contacts C2 and C3 respectively connected to the light emitter 17 and a DC power source P. It will readily be seen that the capacitor C is charged with a voltage when the movable contact C1 is contacted with the fixed contact C3 and the charged voltage is subsequently discharged to energize the light emitter 17 when the movable contact C1 is contacted with the fixed contact C2 so that a single pulse of light is generated. By repeatedly moving the movable contact C1 to alternately contact the fixed contacts C2 and C3, the light emitter 17 will produce a beam of light pulsated at a frequency equal to the frequency of repeated movement of the movable contact C1.

This single pulse of light produced from the light emitter 17 is projected through the first convergent lens 15 towards the object space away from the rangefinder. Assuming that the target object T is located at a predetermined position within zone C in the object space and the pulse of light, which has been produced from the light source 17, and after being reflected from the target object, impinges upon the photoresponsive element 18c of the light receiver 18 after coming through the lens 16, the magnitude of a parameter, for example, the electromotive force or resistance, of the photoresponsive element 18c varies as a function of the intensity of the incident illumination, a sharp increase indicating that light has been reflected from the target object T and therefore the target object is within the zone C.

Figure 8:
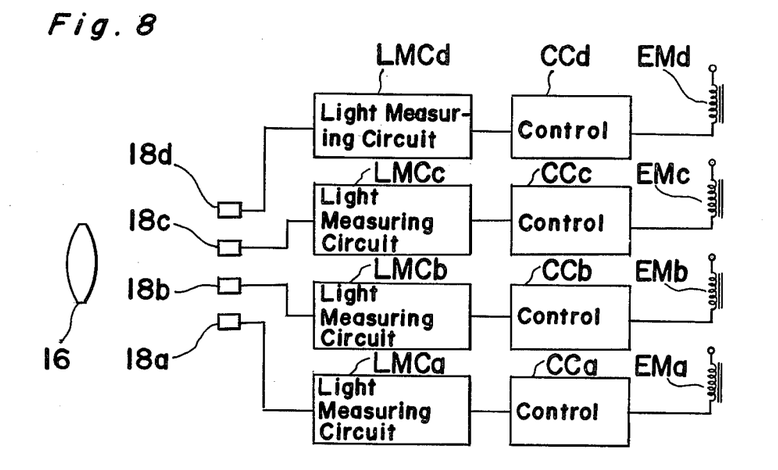
FIG. 8 is a schematic circuit diagram showing means for utilizing signals from the light receiver.

In practice, however, an output signal from any one of the photoresponsive elements 18a to 18d of the light receiver 18, which is indicative of a variation in magnitude of its parameter, is processed by the utilization of a processor having a construction shown in FIG. 8.

The processor shown in FIG. 8 comprises a plurality of series circuits, equal in number to the number of the photoresponsive elements 18a to 18d of the light receiver 18, of light measuring circuits LMCa, LMCb, LMCc and LMCd and control circuits CCa, CCb, CCc and CCd, each of said series circuits being electrically connected between the corresponding photoresponsive element 18a, 18b, 18c or 18d and a corresponding electromagnet EMa, EMb, EMc or EMd. It is to be noted that, where the beam of light emitted from the light emitter 17 is in the form of a single pulse of light, each of the light measuring circuits LMCa to LMCd includes a storage member.

In the above example, i.e., in the case where the photoresponsive element 18c generates an output signal, the latter is fed to the control circuit CCc through the light measuring circuit LMCc to energize the electromagnet EMc.

Each of the electromagnets EMa to EMd is used to control the position of a focusing lens group forming a part of an objective lens assembly of a photographic camera (not shown), which will now be described with reference to FIG. 9.

Figure 9:
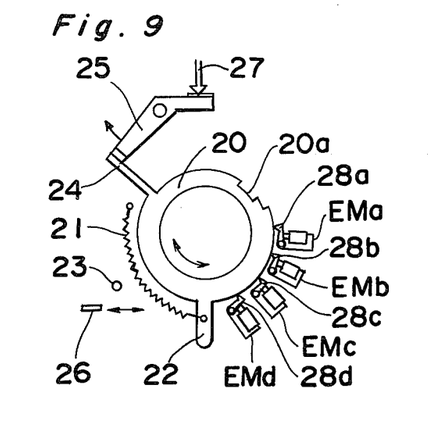
FIG. 9 is a schematic front view of a focusing lens mount operatively associated with electromagnets each adapted to be energized by the means shown in FIG. 8 for effecting a focus adjustment.

Referring now to FIG. 9, there is shown a focusing ring 20 which is to be understood as rigidly coupled to a lens mount for the support of the focusing lens group (not shown) of the objective lens assembly of the camera. This focusing ring 20 is rotatable about the optical axis of the objective lens assembly of the photographic camera to move axially between an infinity or hyperfocal position, in which the objective lens assembly of the camera is focused on a target object spaced at an infinity distance from the camera, and a near-point position in which the objective lens assembly of the same camera is focused on the target object spaced a minimum possible distance from the camera. This focusing ring 20 is normally biased to the infinity position by the action of a biasing spring 21 disposed between a fixed portion of the objective lens assembly and an arm 22 extending radially outwardly from the focusing ring 20, which arm 22 is normally engaged with a top pin 23.

The focusing ring 20 also has an engagement arm 24 protruding radially outwardly therefrom and adapted to engage one end of a pivotally supported stop lever 25, as shown in FIG. 9, after the focusing ring 20 has been rotated counterclockwise against the biasing spring 21 to the near-point position, to block clockwise rotation of the focusing ring. The counterclockwise rotation of the focusing ring 20 is effected by means of a charge lever 26 engageable with the arm 22 to rotate the focusing ring 20 from the infinity position towards the near-point position, as shown, against the action of the biasing spring 21. This charge lever 26 is to be understood as operatively associated with a known shutter charge mechanism (not shown) in the camera such that, when the shutter charge is effected, for example, by advancing a film winding lever to bring the shutter mechanism into a position ready to take a photographic picture, the focusing ring 20 is at the same time rotated to the near-point position against the action of the biasing spring 21.

Clockwise rotation of the focusing ring 20, which has been rotated to the near-point position in the manner described above, back to the infinity position is effected by the action of the biasing spring 21 when an external pushing force is applied to the other end of the stop lever 25, as shown by the arrow 27, to disengage the first mentioned end of the lever 25 from the engagement arm 24. The external pushing force 27 may be applied to the stop lever 25 by way of a known shutter release button (not shown) shortly before the latter is completely depressed.

The focusing ring 20 has in the outer periphery an engagement recess 20a, the function of the latter being described subsequently.

The electromagnets EMa to EMd are arranged externally of the path of travel of the engagement recess 20a, which moves angularly as the focusing ring 20 is rotated between the near-point position and the infinity position. Operatively associated with the electromagnets EMa to EMd are pivotally supported pawls 28a, 28b, 28c and 28d each being pivotable between an operative position, in which the pawl 28a, 28b, 28c or 28d is engageable in the engagement recess 20a when the latter is, during the rotation of the focusing ring 20 from the near-point position back towards the infinity position, brought into alignment with such pawl, and an inoperative position clear of the outer periphery of the focusing ring 20. These pawls 28a to 28d are to be understood as being normally biased to the respective inoperative positions unless the associated electromagnets EMa to EMd are energized in a manner as will now be described.

From the foregoing, it will readily be seen that, assuming that the electromagnet EMc is energized by the output signal fed thereto through the light measuring circuit LMCc and then the control circuit CCc in the manner described above while the focusing ring 20 has been rotated to the near-point position as shown in FIG. 9, the corresponding pawl 28c is brought to the operative position and engaged with the outer peripheral edge of the focusing ring 20. Subsequent disengagement of the engagement arm 24 from the stop lever 25 results in clockwise rotation of the focusing ring 20 back towards the infinity position by the action of the spring 21. During this rotation of the focusing ring 20 back towards the infinity position, the pawl 28c in the operative position relatively slides along the outer periphery of the focusing ring 20 and subsequently falls into the engagement recess 20a. At the moment the pawl 28c is so engaged in the engagement recess 20a, the objective lens assembly is focused on the target object T located within the zone C as shown in FIG. 2.

It is to be noted that, in the case where the target object is located beyond the furthest zone none of the photoresponsive elements 18a to 18d generate an output signal and, therefore, none of the electromagnets EMa to EMd is energized. In this case, the focusing ring 20 is, upon disengagement of the engagement arm 24 from the stop lever 25, rotated back to the infinity position whereby the objective lens assembly of the camera is focused on the target object located an infinity distance away from the camera.

Referring back to FIGS. 3 and 4, in accordance with the present invention, each of the first and second convergent lenses 15 and 16 is in the form of a convergent toroidal lens cut to assume a substantially rectangular configuration, the curvature of the toroidal surface in the lengthwise direction being different from, more specifically, smaller than, that in the widthwise direction. Alternatively, each of the first and second convergent lenses 15 and 16 may be in the form of a convergent cylindrical lens cut to assume a substantially rectangular configuration. In either case, these first and second convergent lenses 15 and 16 having a substantially rectangular configuration are so arranged as to have their lengthwise directions parallel to the lengthwise direction of the light emitting area 17a of the light emitter and to the lengthwise direction of each of the photoresponsive elements 18a to 18d. By this arrangement, a substantially linear or ribbonshaped beam of light emitted from the light emitter 17 is, as it passes through the first rectangular convergent lens 15, converged to provide a substantially slit-like beam of light which strikes the target object. On the other hand, an image of the slit-like beam of light projected from the light emitter 17 towards the target object is, even though it spreads before reaching the second rectangular convergent lens 16, converged by the lens 16 to provide a substantially slit-like image which is formed on one of the photoresponsive elements 18a and 18d.

Figure 4:
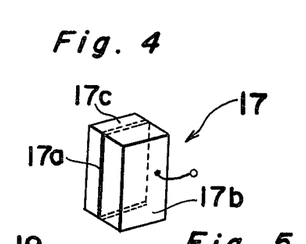
FIG. 4 is a perspective view of a light emitter employed in the rangefinder shown in FIG. 2.
Figure 5:
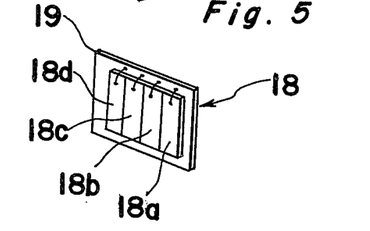
FIG. 5 is a perspective view of a light receiver employed in the rangefinder shown in FIG. 2.

The light emitter 17 of the type having a rectangular light emitting area 17a is well known to those skilled in the art and can be manufactured by joining together a pair of wafers, i.e. semiconductor layers, 17b and 17c to form a light emitting junction therebetween, and then by cutting the resultant block of the wafers 17b and 17c in a direction perpendicular to the plane of junction between the wafers 17b and 17c to provide a rectangular surface area in which the light emitting area 17a of the light emitting semiconductor layers extends lengthwise of said rectangular surface area.

As is well known to those skilled in the art, the intensity of light emitted in a direction at right angles to the plane of the junction between the wafers 17b and 17c tends to be reduced as the light passes through the semiconducting layer. The reduction of the amount of light is 15 to 20% as compared with the intensity of light emitted from the exposed junction in a direction parallel to the plane of the junction between the wafers 17b and 17c. On the other hand, where the light emitted in a direction at right angles to the plane of the junction between the wafers 17b and 17c, the surface area of the light emitting face of the light emitter is substantially equal to the surface area of the junction therebetween and, therefore, the size of the light emitter must be reduced where a relatively small bundle of rays of light is desired. However, where the light is emitted in a direction parallel to the plane of the junction between the wafers, the light emitting area of the light emitter and the surface area of the face of the light emitting semiconductor and rays of light emitted from adjacent P-type and N-type semiconductor layers are not involved and, therefore, with a light emitter of the type having an elongated light emitting area such as employed in the present invention a linear or ribbon-shaped beam of light of relatively high intensity can be produced.

Figure 6:
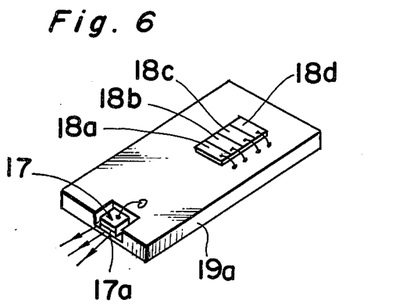
FIG. 6 is a perspective view of the light emitter and the light receiver both formed on a common support base according to the present invention.
Figure 11A:
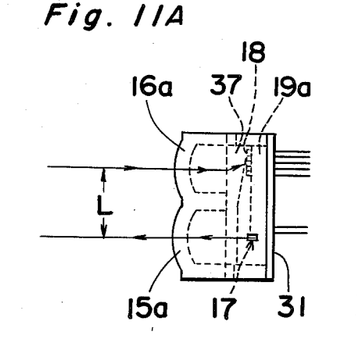
FIGS. 11A and 11B are top plan and exploded views, respectively, of a rangefinder module according to another preferred embodiment of the present invention.
Figure 11B:
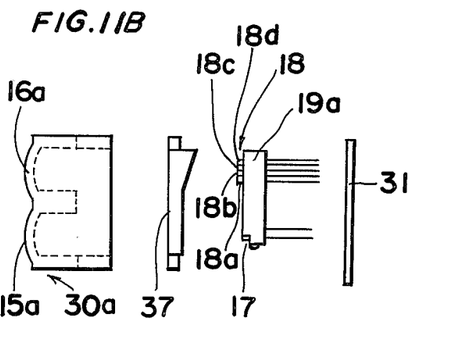

Furthermore, in the practice of the present invention, as best shown in FIG. 6, the light emitter 17 and the light receiver 18 are rigidly mounted on a single common support base 19a. Referring now to FIG. 6, the common support base 19a has a rectangular shape and has one surface on which the photoresponsive elements 18a to 18d are rigidly mounted and positioned in side-by-side relation to each other in a direction lengthwise of the support base 19a. This support base 19a has a recess 19b for accommodating the light emitter 17 having the construction described particularly with reference to FIG. 4. Within this recess 19b in the support base 19a, the light emitter 17 may be positioned either with its light emitting area 17a facing outwards in a direction substantially perpendicular to the plane of the photoresponsive elements 18a to 18d, such as shown in FIG. 6, or with its light emitting area 17a facing outwards in a direction parallel to the direction in which the photoresponsive elements 18a to 18d face such as shown in FIGS. 11A and 11B.

As another essential feature of the present invention, the elements 15, 16, 17 and 18 are made into a rangefinder module the use of which contributes to a reduction in size of the photographic camera and also to substantial elimination of such position adjustments as are required for the conventional rangefinders during installation of the rangefinder in the camera. The rangefinder module constructed in accordance with the present invention will now be described with reference to FIGS. 10 to 12.

Figure 3:
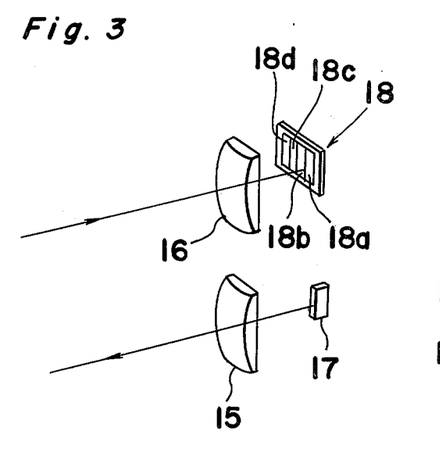
FIG. 3 is a schematic perspective view of the system shown in FIG. 2.
Figure 10:
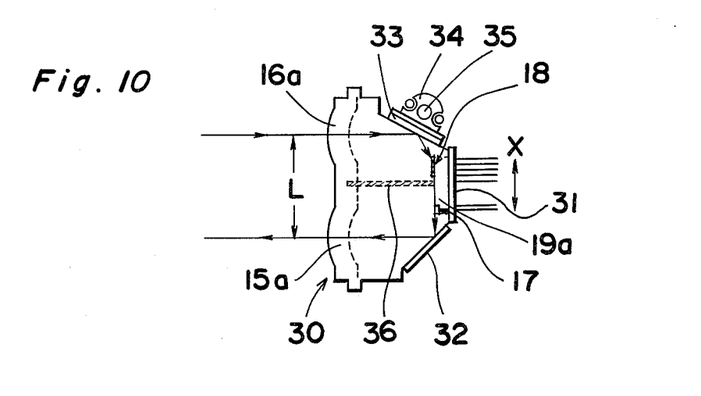
FIG. 10 is a top plan view of a rangefinder module according to one preferred embodiment of the present invention.

Referring first to FIG. 10, the first and second convergent lenses, shown separately at 15 and 16 in FIGS. 2 and 3, are integrally formed at 15a and 16a in a monolithic hollow block, generally identified by 30, of synthetic resin by the use of any known plastic molding technique. This monolithic hollow block 30 carries the support base 19a, having the light emitter 17 and the light receiver 18 as shown in FIG. 6, in a manner as will subsequently be described.

The support base 19a having the light emitter 17 and the light receiver 18 arranged in the manner described with reference to FIG. 6 is rigidly carried by the hollow block 30 of synthetic resin by means of a back-up plate 31 and is so positioned that the light emitter 17 has its light emitting area 17a facing in a direction at right angles to the optical axis of the first convergent lens portion 15a while the light receiver 18 faces in a direction parallel to the optical axis of the second convergent lens portion 16a.

For guiding the slit-like beam of light, which emerges from the light emitting area 17a of the light emitter 17 in a direction at right angles to the optical axis of the first convergent lens portion 15a, in a direction towards the first convergent lens portion 15a, a reflecting mirror 32 is utilized and is rigidly supported on the hollow block 30 in a manner as shown. The hollow block 30 also carries another reflecting mirror 33 positioned in substantially opposed relation to the reflecting mirror 32 and on one side of the assembly of the elements 17 and 18 remote from the mirror 32 and supported by a support member 34 adjustably mounted on a pin member 35 connected to the hollow block 30. The angle of inclination of the reflecting mirror 33 relative to the optical axis of the second convergent lens portion 16a is so selected that the image of the light emitting area 17a of the light emitter 17 carried by the beam of light emitted therefrom can, after having been reflected from the target object which may be located in any one of the zones A to D, be sharply formed by the second convergent lens portion 16a on a corresponding one of the photoresponsive elements 18a and 18d of the light receiver 18. This angle of inclination of the reflecting mirror 32 is permanently fixed once it has been adjusted during the manufacture of the photographic camera having the rangefinder built therein.

The hollow block 30 has in its interior a partition wall 36 for avoiding any possible interference of the light from the light emitter 17 and from the light receiver 18.

In the example shown in FIG. 10, it has been described that the position of the light receiver 18 relative to the optical axis of the second convergent lens portion 16a can be adjusted by rotating the reflecting mirror 33 to vary the angle of inclination thereof. However, assuming that the reflecting mirror 33 is fixed at a predetermined angle relative to the optical axis of the second convergent lens portion 16a during the manufacture of the rangefinder, then the adjustment of the position of the light receiver 18 relative to the optical axis of the second convergent lens portion 16a so that the image of the light emitting area 17a of the light emitter 17 projected on the target object can be sharply focused by the second convergent lens portion 16a on a corresponding one of the photoresponsive elements 18a to 18d can be achieved merely by displacing the back-up plate 31 in a direction as indicated by arrow X in FIG. 10 prior to the assembly of the elements 17, 18, 19a and 31 being fixed in position relative to the hollow block 30. In either case, the base length L between the light emitter 17 and the light receiver 18 does not vary since they are fixed on the support base 19a which is in turn secured to the back-up plate 31.

In FIGS. 11A and 11B a rangefinder module is illustrated which utilizes a light emitter 17 of the type supported by the support base 19a together with the light receiver 18, but having its light emitting area 17a facing in a direction at right angles to the plane of the surface of the support base 19a on which the photoresponsive elements 18a to 18d are arranged.

Referring to FIGS. 11A and 11B, the rangefinder module comprises a molded hollow block 30a of synthetic resin having a substantially cubic configuration and having a front wall formed into the first and second convergent lens portions 15a and 16a. This hollow block 30a carries the assembly of the elements 17, 18, 19a and 31 at a position opposed to the front wall in such a manner that the light emitter 17 faces towards and is aligned with the optical axis of the first convergent lens portion 15a while the light receiver 18 faces towards and is substantially aligned with the optical axis of the second convergent lens portion 16a.

In order for the image of the light emitting area 17a of the light emitter 17 projected on the target object to be sharply focused by the second convergent lens portion 16a on a corresponding one of the photoresponsive elements 18a and 18d depending upon which zone the target object occupies, an optical wedge 37 is accommodated within the hollow block 30a and positioned between the front wall of the block 30a and the assembly of the elements 17, 18, 19a and 31.

The rangefinder module having the construction shown in FIGS. 11A and 11B does not require the use of reflective mirrors such as required in the rangefinder module having the construction shown in FIG. 10 and, therefore, is more compact and less expensive than the latter.

It is to be noted that although the optical wedge 37 has been described as being accommodated within the block 30a in the example shown in FIGS. 11A and 11B, it may be positioned outside the block 30a and in front of the second convergent lens portion 16a in terms of the direction in which the rangefinder is aimed at the target object.

Figure 12:
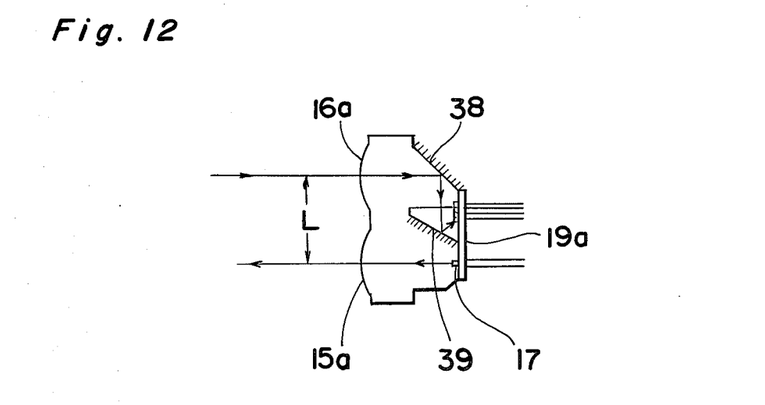
FIG. 12 is a schematic view similar to FIG. 10, showing a rangefinder module according to a further preferred embodiment of the present invention.

In the example shown in FIG. 12, the rangefinder module is so designed that, while the beam of light emitted from the light emitter 17 is projected towards the target object through the first convergent lens portion 15a without being deflected such as effected in the example of FIG. 10, the beam of light passing through the second convergent lens portion 16a travels towards a corresponding one of the photoresponsive elements 18a to 18d of the light receiver 18 after having first been deflected by a first reflecting surface 38 towards a second reflecting surface 39 and then deflected by the second reflective surface 39 towards the corresponding one of the photoresponsive elements 18a to 18d. The first and second convergent lens portions 15a and 16a and the first and second reflecting surfaces 38 and 39 are all integrally formed in a monolithic hollow block of synthetic resin by the utilization of any known plastic molding technique. It is to be noted that the angle of inclination of the first reflecting surface 38 relative to the optical axis of the second lens portion 16a is preferably so selected as to deflect the incoming light past the second convergent lens portion 16a at right angles towards the second reflecting surface 39. It is also to be noted that the second reflecting surface 39 serves not only to deflect the beam of light reflected from the first reflecting surface 38 towards a corresponding one of the photoresponsive elements 18a to 18d, but also to prevent the light from the light emitter 17 from reaching the light receiver 18 without passing through the first convergent lens portion 15a.

While the rangefinder according to the present invention is constructed as hereinbefore fully described, it is to be noted that the light emitter 17 and the photoresponsive elements 18a to 18d may be formed on a common substrate, in which case a precise relative position can be attained between them. In particular, if the substrate is made of GaAs, the resolution of each of the photoresponsive elements 18a to 18d can be limited to the wavelengths in a relatively narrow bandwidth and, therefore, photoresponsive elements 18a to 18d which do not respond ambient light can be provided.

Although the present invention has fully been described by way of example, it is to be noted that various changes and modifications will be apparent to those skilled in the art. Such changes and modifications are, unless they depart from the true scope of the present invention, to be understood as being included therein.

We claim:

1. A rangefinder of the zone-monitoring type for a photographic camera, the rangefinder comprising a light emitter means for emitting and projecting a beam of light for illuminating a target object located within one of a plurality of zones at different distances away from the rangefinder, a first convergent lens positioned for receiving and converging the beam of light projected by the light emitter means, a light receiver positioned in a predetermined position offset laterally from the light emitter means relative to the direction in which the light is projected through said first convergent lens, said light receiver including a plurality of photoresponsive elements for detecting the image of the beam of light reflected from the target object, each of said photoresponsive elements being positioned to receive the image reflected from a target object in a corresponding zone, each of said photoresponsive elements having a parameter the magnitude of which varies as a function of the intensity of the light incident thereon, a second convergent lens for receiving light from a target object and forming an image of the area of the target object, illuminated by the projected beam of light on one of the photoresponsive elements corresponding to the zone where the object is located, means coupled to the light receiver and responsive to changes in the magnitude of the parameter of the illuminated photoresponsive elements for providing a signal representative of the zone which the target object actually occupies, and a plate member on which said light emitter means and said light receiver are rigidly mounted.

2. A rangefinder as claimed in claim 1, wherein said first and second convergent lenses are integrally formed of a plastic material.

3. A rangefinder as claimed in claim 1, further comprising means positioned between a first optical path, extending between the light emitter and the first convergent lens, and a second optical path, extending between the light receiver and the second convergent lens, for shielding the light from the light emitter from the light receiver.

4. A rangefinder as claimed in claim 1, wherein said light emitter means comprises a pair of wafers, each having a light emitting semiconductor layer on one surface thereof, the light emitting semiconductor layers of the respective wafers being joined together and then cut transversely to the thickness of the wafers to provide a substantially rectangular light emitting area for emitting the beam of light to be projected.

5. A rangefinder as claimed in claim 1, further comprising a supporting member integrally supporting said first and second convergent lenses, said supporting member being coupled with said plate member to form a rangefinder module.

6. A rangefinder as claimed in claim 1, wherein the light emitter has a substantially elongated light emitting area from which the beam of light is projected, and wherein said first convergent lens has a substantially rectangular shape, said light emitter and said first convergent lens having the lengthwise direction of said light emitting area parallel to the lengthwise direction of the first convergent lens.

7. A rangefinder as claimed in claim 6, wherein said second convergent lens has a substantially rectangular shape, said second convergent lens having the lengthwise direction parallel to the lengthwise direction of the first convergent lens.

8. A rangefinder as claimed in claim 1, further comprising an optical means positioned between the second convergent lens and the light receiver for deflecting the reflected beam of light which has passed through the second convergent lens towards a corresponding one of the photoresponsive elements depending upon the position of the target object within any one of the zones, and wherein said photoresponsive elements are disposed in a plane normal to the optical axis of said second convergent lens and said light receiver has each of said photoresponsive elements at a position conjugate with the corresponding zone with respect to the second convergent lens.

9. A rangefinder as claimed in claim 8, wherein said optical deflecting means includes a first mirror member, which deflects the reflected beam of light at right angles, and a second mirror member which deflects the light from the first mirror member to said one of the photoresponsive elements.

10. A rangefinder as claimed in claim 8, wherein said optical means is an optical wedge.

11. A rangefinder as claimed in claim 8, wherein said optical means is a prism.

12. A rangefinder as claimed in claim 8, wherein the photoresponsive elements are rigidly mounted on one surface of the plate member and arranged in side-by-side relation to each other and the light emitter means is rigidly mounted on said one plate of said support member laterally of said light receiver.

13. A rangefinder as claimed in claim 12, wherein said light emitter means has a light emitter with a light emitting area, said light emitter being positioned on said plate member with said light emitter area facing in a direction perpendicular to the plane of said one surface of said plate member.

14. A rangefinder as claimed in claim 13, further comprising an additional optical means positioned in an optical path between the light emitter and the first convergent lens for deflecting the projected beam of light from the light emitter at right angles towards the first convergent lens.

* * * * *